United States Patent [19]
Kurreck

[11] 4,082,492
[45] Apr. 4, 1978

[54] MOLD CLOSING APPARATUS

[75] Inventor: Manfred Kurreck, Bochum-Weitmar, Germany

[73] Assignee: Holstein und Kappert Aktiengesellschaft, Dortmund, Germany

[21] Appl. No.: 693,120

[22] Filed: Jun. 3, 1976

[30] Foreign Application Priority Data

Jun. 6, 1977 Germany .............................. 2525161

[51] Int. Cl.² .......................... B29C 1/00; B29C 1/16
[52] U.S. Cl. .................................... 425/451; 425/541; 425/450.1
[58] Field of Search .......................... 264/98, 99, 210; 425/451, 450.1, DIG. 205, DIG. 211, 541, 532

[56] References Cited

U.S. PATENT DOCUMENTS 3,079,637  3/1963  Margillier ...................... 425/451 X
3,743,466  7/1973  Gampe ........................... 425/451

Primary Examiner—Richard B. Lazarus
Attorney, Agent, or Firm—Michael J. Striker

[57] ABSTRACT

In a molding process wherein a pair of mold halves pivoted on respective axes flanking a mold-closing plane are closed together scissor-fashion on an extrusion issuing continuously down in the vertical mold-closing plane, each of the mold halves is displaced during closing of the mold halves away from its respective pivot axis. Such displacement away from the axis is effected by means of a cam arrangement during the last stages of closing in order to insure that the mold cavities remain perfectly aligned with the extrusions being closed in them.

5 Claims, 3 Drawing Figures

MOLD CLOSING APPARATUS

BACKGROUND OF THE INVENTION

The present invention relates to molding. More particularly this invention concerns a mold closing arrangement for an extrusion-type blow molder.

In a common blow molding operation an extruder presses out a tube or parison which is then formed in a mold cavity defined between a pair of mold halves. Gas under pressure is used to force the walls of the parison against the inside of the mold cavity in order to give it the desired hollow shape. Thereafter the element is cooled and, if desired, filled.

Normally each mold half is mounted to one side of a vertical mold plane along which one or more parisons are extruded. It is necessary to force the mold halves together with considerable pressure during the molding operation. Furthermore the mold cavities must be exactly aligned with the parisons in order to prevent some of the extruded material from catching between the faces of the mold not at the cavities and therefore ruining the entire batch.

When the bodies are to be filled and closed in the same machines it has been common practice to use two sets of mold halves which can act on the continuously extruded parisons in a hand-over-hand manner. Thus each pair of mold halves is arranged to be closable scissor-fashion on the parison, and furthermore each of the two pairs of mold halves can be displaced vertically. Thus the one mold half closes on the parisons and it moves down with the continuously extruded material while the other mold half engages above it and similarly moves down. Then the lower mold pair opens and swings up past the still closed upper pair and it closes on the parisons above it. To this end the support for each of the scissor-type molds are on opposite sides of the apparatus in order to allow them to pass each other as they alternate.

In such devices it is usually necessary to pivot each of the mold halves about a vertical axis offset from the mold-closing plane so that the mold axes of each pair symmetrically flank the respective mold closing plane. This type of construction causes the registering recesses that constitute the mold cavity when the two halves lie together to move so that in the last stages of closing they effectively move toward their respective pivot axes in a direction parallel to the mold-closing plane. This movement often results in trapping of some of the material at locations offset from the mold cavity between the molds so that the mold halves cannot close properly. To date the only method of overcoming this difficulty has been to provide a relatively large mold-cavity opening so that the misalignment during closing is compensated for. Such a use of large openings, however, requires considerable redesign of the molding apparatus and greatly increases its cost.

SUMMARY OF THE INVENTION

It is therefore an object of the present invention to provide an improved molding method and apparatus.

Another object is to provide an improved method and apparatus for closing a mold in an injection-type blow-molding arrangement.

A further object is to provide an improved method and apparatus which overcomes the above-given disadvantages.

These objects are attained according to the present invention in a molding process of the above-described general type, but wherein the mold halves are displaced away from their respective pivot axes at least during the last stages of displacement of the mold halves toward each other and closing on the parisons or extrusions. In accordance with this invention the halves are displaced away from their respective pivot axes synchronously with their closing so that the cavities remain centered on the extrusions.

This is obtained according to the present invention in an apparatus having a fixed cam which engages the angularly innermost ends of the mold halves during the last stages of closing and forces them outwardly so that they remain perfectly centered on the extrusion or extrusions between them.

According to yet another feature of this invention a fluid cylinder is provided which normally urges the mold halves inwardly toward their respective axes on pivotal supports. The cam pushes the mold halves away from their pivot axes on the supports against the force of this urging means during the last stages of closing.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

DESCRIPTION OF THE PREFERRED EMBODIMENT

Figure 2:
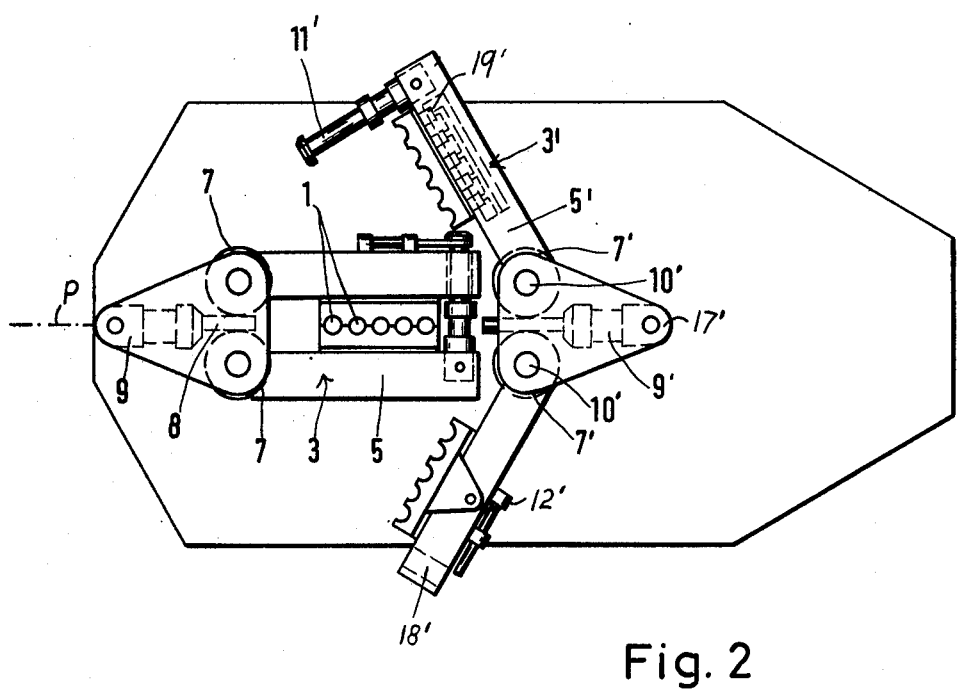
FIG. 2 is a smaller scale top view of the apparatus in accordance with this invention.
Figure 3:
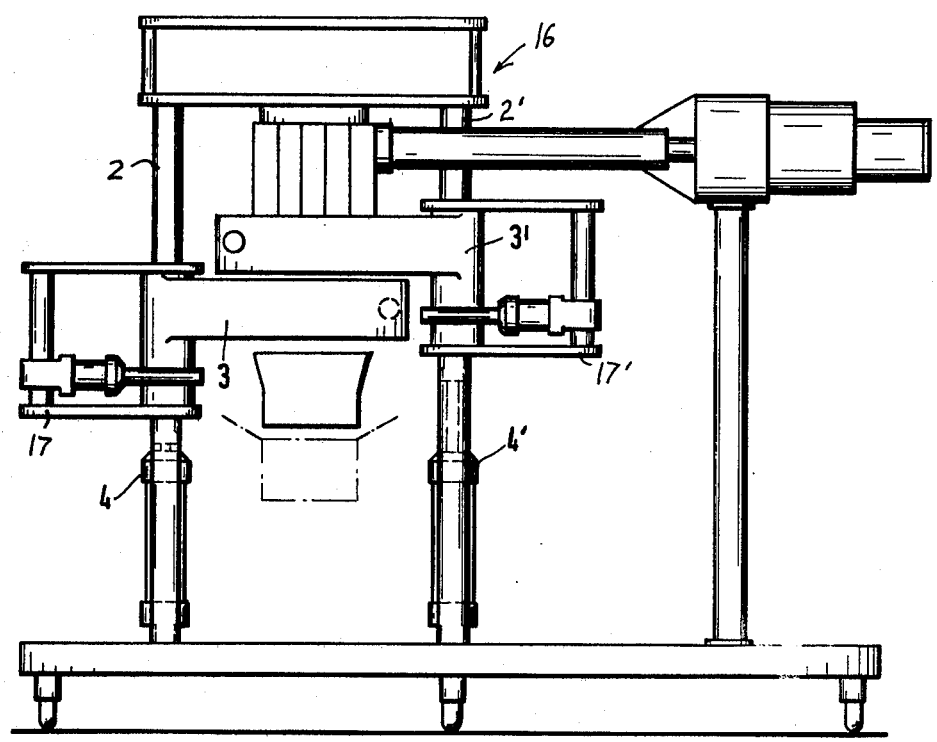
FIG. 3 is a side view of the apparatus of FIG. 2.

As shown in FIGS. 2 and 3 an extruder 16 according to this invention continuously produces five tubes or parisons 1 which all lie in a common vertical plane P. A pair of molding devices 3 and 3' vertically reciprocal on respective guides 2 and 2' by respective cylinders 4 and 4' are provided underneath the extruder 16.

Figure 1:
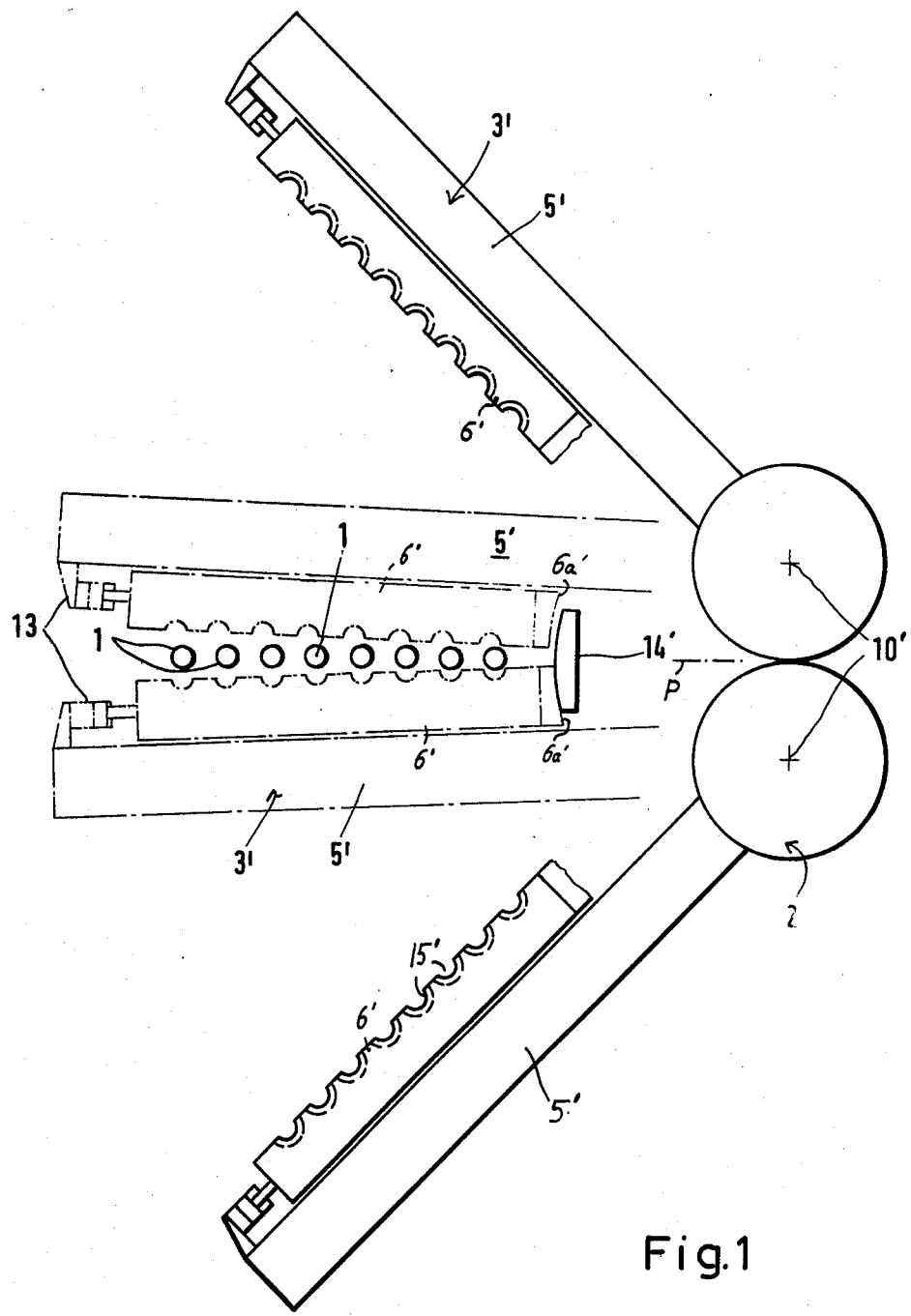
FIG. 1 is a top view in enlarged scale showing operation of the apparatus according to this invention.

The molding arrangements 3 and 3' are identical so that hereafter any description of one of the molding arrangements is applicable to the other. As also shown in FIG. 1 the molding arrangement 3' has a pair of like arms 5' carrying respective like die halves 6' formed with mating recesses 15'. In FIG. 1 eight such recesses 15' for respective parisons 1 are shown. Each of the arms 5' is pivotal about a respective vertical axis 10' offset from the plane P. At their pivoted ends the arms 5' carry as shown in FIG. 2 gears 7' that mesh with a horizontally reciprocal rack carried on a cylinder 9' carried on a support 17' vertically displaceable on the guide rods 2' which define the axes 10'.

One of the arms 5' carries at its outer end a shortenable cylinder 11' whose piston rod is engageable in a notch 18' and under a fork carried by a cylinder 12' on the other arm 5'. Thus when the two arms 5' are displaced together the piston rod of the cylinder 11' first in the notch 18', can engage under the fork of the cylinder 12', and then can be shortened so as to lock the two arms 5' tightly together.

As best shown in FIG. 1 each of the mold sections 6' is slidable toward and away from the respective axis 10' on the respective arm 5'. A pneumatic cylinder 13 normally urges these mold halves 6' towards the axes 10'. At their ends toward the axes 10' the cylinders 6' have surfaces 6a' which are engageable with the curved outer surface of a cam 14' carried on the respective support 17' of the respective mold arrangement 3'.

The device functions as follows:

As the extruder 16 continuously emits a plurality of parisons 1 the mold arrangement 3' moves from the solid-line open position shown in FIG. 1 to the dot-dash position of FIG. 1 in which it is almost closed. As soon as it attains this position the surfaces 6a' come to rest on the cam 14' so that further closing of the two arms 5' toward each other forces the mold halves 6' outwardly away from the axes 10' and insures their proper alignment on the parisons 1. Once the mold is fully closed the locking arrangement 11', 12' and 18' secures the two arms 5' together and the pneumatic molders 19' in the arms 5' serve to shape the parisons 1. During such shaping the respective vertical actuator 4' draws the molder 3' down synchronously with the extruded parison.

While the one molder 3' is clamped on the parisons 1 the other molder may be moved from a position below it to a position above it so that the two can effectively leap-frog or move hand-over-hand down the continuously extruded parisons.

It will be understood that each of the elements described above, or two or more together, may also find a useful application in other types of apparatus differing from the types described above.

While the invention has been illustrated and described as embodied in a molding system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

I claim:

1. A molding apparatus comprising:
   extruding means for forming an extrusion lying on a mold plane;
   a pair of mold halves engageable together at said plane and having respective registrable mold cavities engageable at said plane around said extrusion;
   respective pivots for said halves spacedly flanking said plane
   closing means for angularly displacing said halves about their respective pivots for closing said halves together scissor-fashion on said extrusion at said plane; and,
   centering means for displacing each of said halves away from its respective pivot axis during at least the last stages of closing, whereby said cavities remain centered on said extrusion.

2. The apparatus defined in claim 1, wherein said centering means includes an element operatively engageable with said halves after same pass during closing a predetermined angular position spaced from said plane.

3. The apparatus defined in claim 2, wherein said element is a fixed cam.

4. The apparatus defined in claim 3, further comprising means normally urging each of said halves toward the respective pivot axis.

5. The apparatus defined in claim 4, wherein said means for urging includes a fluid cylinder on each half.

* * * * *